United States Patent Office 2,987,813
Patented June 13, 1961

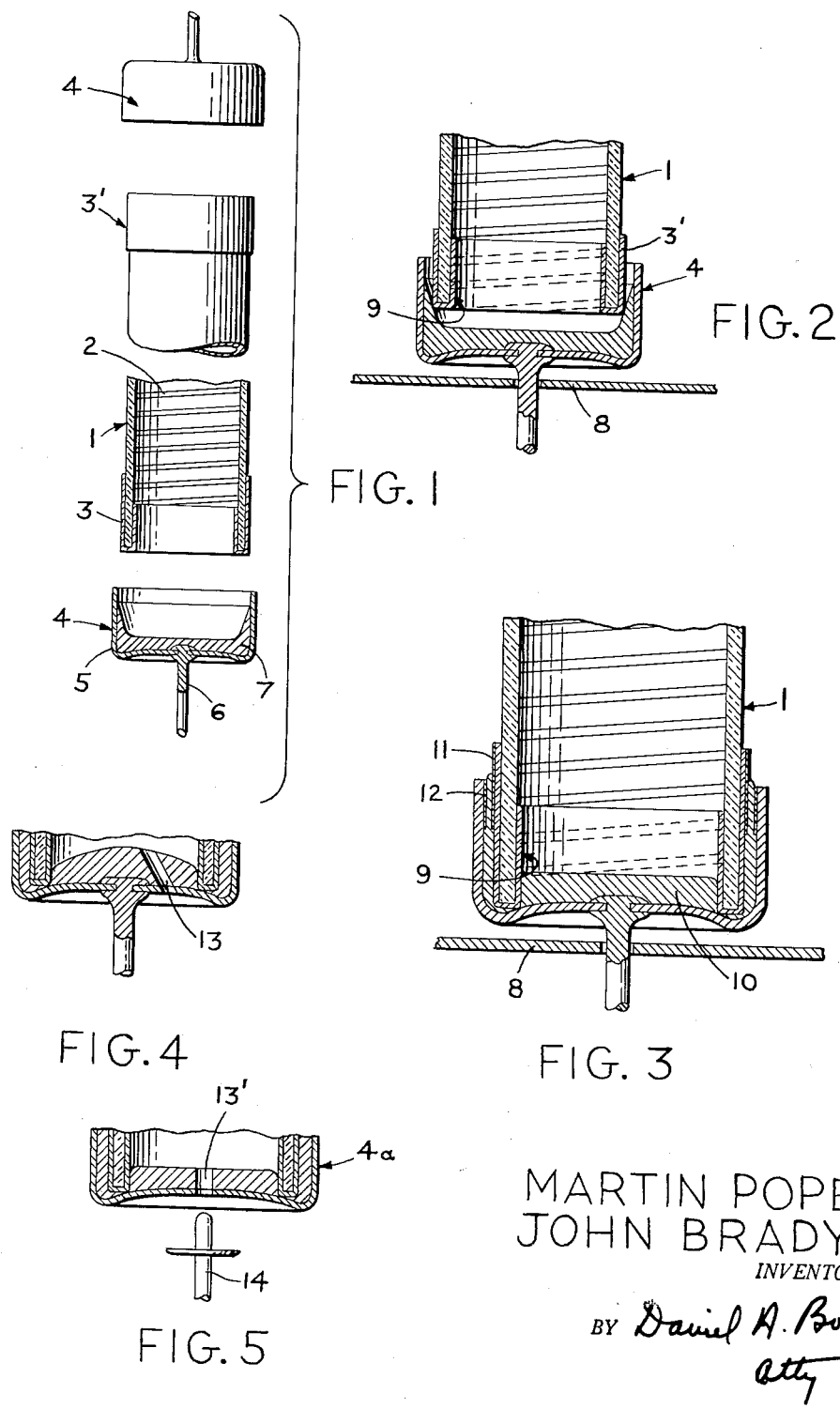

2,987,813
HERMETICALLY SEALING A TUBULAR ELEMENT OR CONTAINER

Martin Pope, Brooklyn, N.Y., and John Brady, Clifton, N.J., assignors to American Resistor Corporation, Livingston, N.J., a corporation of New Jersey
Filed May 1, 1957, Ser. No. 656,231
3 Claims. (Cl. 29—471.1)

This invention relates generally to a sealing technique and more particularly to a soldering method for hermetically sealing end seals on a tubular element such that all possible flux residues are excluded from the interior of this member.

In particular, the present invention will be described in its application to electronic elements such as resistors or capacitors, but it will be understood that the sealing technique is equally applicable to other fields such as foods, pharmaceuticals, etc.

It has been found in the manufacture of hermetically sealed resistors which consist of a glass or non-metal tube having a metal film resistive element on the interior surface and metal caps soldered on each end that if the conventional soldering techniques are utilized to hermetically seal the end caps to the tube body that certain deleterious effects result by reason of the partially or wholly decomposed flux residue which remains in the sealed tube.

In general, for normal soldering operations, this flux is not harmful but in the described type of resistors it affects performance to a measurable extent. For example, even when a flux is a so-called neutral material, its presence in the tubular element during changes in temperature may cause loosening of the metal film. Where the flux residues are partly decomposed, the decomposition products may be of a nature that will react chemically with the bonded metal film on the interior of the tubular element or might in fact, if acid in nature, attack the metal film rapidly.

In other electronic components such as capacitors having a similar design including a hollow-non-metal tubular element and end caps sealing the same, which structures have a high insulation resistance, and are designed to operate at temperatures between 100° C. to 200° C., the flux residue may flow or diffuse to form a more or less continuous film between the respective plates of the capacitor, which film especially if it carbonizes will cause the measured value of the insulation resistance to fall outside of the specified tolerance limits.

And still further is the effect of the small quantities of alcohol in standard rosin fluxes which also can both damage the bonded metal film resistors or lower the insulation resistance depending on the particular electronic element involved.

It has, therefore, become essential that a method of soldering be devised in which flux and any of its components or decomposition products be eliminated from the interior of the hollow tubular element either before or during the operation of forming the hermetically sealed end closures or caps by soldering.

The present invention covers a means of overcoming this problem by providing a method of soldering or a soldering technique which provides a hermetically sealed non-metallic tubular member or product in which the flux and its components utilized in the soldering process are rigorously excluded from the interior of the tubular element before and during the steps of hermetically sealing the end caps to the tubular body by providing successive liquid seals of molten solder on each of the respective open ends of the tubular elements as the end seals or caps are being attached to the tubular element.

The method of making hermetically sealed solder joints contemplates preparing the tubular elements and the end seals or caps independently of each other and then joining these elements by the desired method of soldering or soldering technique.

The tubular element

As a general rule, the tubular elements in electronic components of this type may be glass or ceramic or resinous materials of various types. These tubular elements are prepared by first firing on bands of metallic paint or material on the outer surfaces thereof adjacent each of the respective ends. This is followed by preparing the interior surface of the tube depending on whether it is a resistive or a capacitive electronic element. For example, the evaporation or firing of a suspension of a suitable metal in a solvent to the interior of the tube is a step which is well known in the art. The last step is to fire on a metallic conductive paint or material on the interior of the tubular element adjacent the respective ends thereof and also over the ends so that the desired electrical contact through the electronic element is properly established.

It is well known in the art that metallized materials or paints fired on a non-metallic tubular element is readily wet by solder provided the solder is properly fluxed.

The end seals

The end seals or caps are prepared by pre-soldering the interior portions thereof so that they are covered uniformly with a predetermined quantity of solder. The quantity of solder required is in part an empirical factor which depends on sufficient solder being present to perform two functions:

(a) To allow the solder to rise sufficiently between the exterior of the tubular element and the interior of the end seal when they are joined as hereinafter described so that contact may be made with the metalized band formed or provided on the exterior of the tubular element and thereby to effect a hermetical seal between the cap and the tubular element.

(b) To effect a seal at the bottom of the glass tube during the hermetic sealing step regardless of misalignment between the bottom of the edge of the tube and the bottom of the end seal or cap so that during the soldering operation, flux or flux components used for making the hermetic seal or any residues left after the soldering operation will not penetrate into the interior of the tubular element.

In presoldering the end seal or cap, the cap may be positioned in a holder of any suitable type with the open end upward. A suitable quantity of flux and solder are placed within the cap and heat is then applied as by a soldering iron, resistance heater, or induction heat until the solder melts and flows uniformly around the base of the interior of the cap. Where a swagged-in lead is provided, the solder covering the interior of the cap will strengthen this type connection.

On cooling, the solder will have a U-shaped appearance in cross section.

The end seal will of course be cleaned with solvent, etc., as is well known in the art to exclude any foreign material as this can cause adverse results in an electronic element or introduce a contaminant into the contents that would be held by the tubular element in the case of foods or pharmaceuticals, etc.

Joining the tubular element and end seals

Soldering of the tubular element and the end seals occurs in two steps because first one end of the tube must be sealed and then the opposite end must be sealed.

The sealing of the first end presents no great problem other than providing a means for excluding the flux or its components or decomposition products from the interior of the tubular element. However, when sealing the opposite end to close off the tube and provide a hermetically sealed product a problem is presented due to the fact that heating is utilized and, therefore, precautions must be taken so that the escape of air will not affect the hermetically sealed condition desired.

Thus, the first presoldered cap is placed in a resistance type heating mechanism and holder. For example, this may be a nickel-chrome alloy heater strip approximately 3" long x ⅜" wide x ¹⁄₁₆" thick with a ¹⁄₁₆" hole in diameter through its center to allow the lead of the cap to be passed therethrough and to hold the cap in upright position. The strip may be filed down slightly at the center so that most of the heat generated in the resistance strip will be generated near the cap. To control the heat input to the resistance heater a variable transformer takes its power from the standard 110 volt circuit and feeds its output to a low voltage transformer in turn connected to the resistance heater. By adjusting the voltage transformer a point can be located such that on application of current, the center of the resistance heater becomes red-hot in approximately ten seconds. The particular adjustment of the thickness of the resistance strip and the application of voltage are particularly important in the second step of the present operation as is hereinafter described. It will be understood that while specific mention has been made of a resistance strip that other forms of heating mechanisms can be utilized and that the particular form of heating mechanism does not form a portion of the present invention except insofar as it shall provide the mechanism for providing the heat cycle in accordance with the desired operation.

With the cap in position the tube is held so that it may be moved or inserted partly into the cap. Heat is applied to the cap while the tubular element is moved gently against the solder in the cap. Upon melting of the solder, the tubular element sinks into the cap until it touches the bottom of the cap.

Since the solder is molten it will rise both into the interior of the glass tube and into the portion or area between the exterior of the tube and the interior of the end seal or cap element and the portion of the molten solder between the exterior of the glass tube and the interior of the cap should rise high enough to make contact with the metallic band formed adjacent this end of the tube. This, of course, is preferable, but not absolutely necessary as the solder need rise only high enough so that a seal may be effected at the bottom of the glass tube. In other words, a plug of molten solder must effectively prevent the passage of vapors underneath the edge of the glass tube into the interior thereof.

When this condition has been effected, flux can now be inserted between the exterior of the tube and the interior of the cap without any danger of penetration of flux or flux components, flux residues or decomposition products into the inside of the tube. After the flux is applied the heat source is removed and in the presence of the flux the solder will wet the metallic band automatically forming a seal between the cap and the metalized band on the exterior of the tubular element.

As the cap and tube are heated the air within the glass tube will expand. However, since the upper end of the glass tube is as yet unsealed, the air in its expansion during such heating can leave the tube through this upper end. There will be no tendency thus to either push the solder outward from the glass tube or to suck it inward. In making the second seal, however, such a tendency exists and if not counteracted will result in a defective seal and, accordingly, the technique of soldering the opposite cap to hermetically seal the unit is somewhat modified to meet this condition.

This is accomplished in the present method by piercing a small hole through the first end cap substantially parallel to the longitudinal line of the resistor. When the tubular element and the first cap is thus prepared the second cap can be soldered to the single open end of the tubular element in the same manner as above described for the first end cap. Since the first end cap remote from the second end cap being soldered has been pierced as the air in the tubular element expands it escapes through this opening.

With the end caps in assembled position there remain only one final detail, namely, sealing of the opening that has been pierced in the first end cap.

This is done in a two-step soldering process. First, a small quantity of fluxless low temperature solder, for example, a lead-tin combination melting at 180° C. of which there are several easily purchasable on the open market, is deposited at a point on the end cap spaced from the opening but disposed to flow towards the opening when in wetted condition.

Second, at the opening itself a high temperature solder, for example, a fluxless eutectic alloy of lead and silver melting at over 300° is deposited and as the high melting solder seals the opening any minute pores that remain are sealed by the low temperature solder which intermixes and flows toward the opening. Since the high temperature solder will cool and set first, the low temperature solder will have ample time to accomplish the desired sealing results before it, too, will cool and set. The high temperature solder will plug or seal the opening in the first end cap to prevent entrance of any flux vapor, etc. during this latter step of the present method.

This sealing arrangement can be performed under vacuum. This can be accomplished, for example, by placing the caps and tubular elements under a bell jar or housing and evacuating the volume of the jar down to one or two inches of mercury.

When the operation is performed under vacuum then the necessity for piercing the end cap first attached is eliminated.

Further objects and advantages of the present invention will become evident from the following description with reference to the accompanying drawings showing one application of the present method of soldering to an electronic component of the resistor type in which:

FIGURE 1 is a view of the components of a resistor, partly in section, showing a preformed cap and tubular element and their relative relation.

FIGURE 2 is a view of the initial stage of the first step of joining the cap and the tubular element.

FIGURE 3 is a view of the final stage of the first step of joining the cap and the tubular element.

FIGURE 4 is a view of the first cap in assembled position on the tubular element with the hole pierced therethrough.

FIGURE 5 shows a modified form of the first cap in assembled position in a tubular element when the hole is pierced at the point of joinder of the electrical wire lead.

Thus, referring to FIGURE 1, a tubular or hollow cylinder preferably of glass or ceramic material, generally designated 1, is shown having a metal resistive film 2 on the inner surface thereof and at each end suitable metallic paint or material as at 3 and 3' extending about the respective inner surface, the end portions and exterior of the tube. The application of the metallic resistive film and the firing of the metallic paint or material elements 2 and 3 to the non-metal tubular element may be done by any standard methods of which there are several well known in the art.

The cap elements generally designated 4 on either end are identical and consist of a cup-like section 5 having a swagged-in lead 6 along the axial or center line thereof. In the presoldering step when the solder 7 solidifies it wets the bottom of the tube and by action of surface tension will take a U or arcuate shape when viewed in cross-section as in FIGURE 2.

FIGURE 2 shows the cap in assembled position on the resistance heater and holder 8 and the tubular element 1 in position before heat has been applied to the cap. FIGURE 3 shows the position of the tubular element 1 after the heat has been applied causing the solder to become molten. Note the open end 9 of the tubular element adjacent the solder in FIGURE 3 has now moved so that the solder shown at 10 extending into the interior of the tubular element will completely seal the open end and when flux is applied at points 11 and 12 to cause the molten solder to wet the metallic bond 3' on the exterior of the tubular element 1 and the interior of the cap 2 a hermetic seal will be effected between these elements at this point. Thus, the flux, its components or decomposition products are excluded from entering this end of the tubular element.

When the first cap is attached and has cooled, an opening 13 is pierced or punched or otherwise formed in the first cap. The tubular element is now inverted and the soldering of a second cap 4 is now established in the same manner as described for the first cap.

After the second cap is attached and cooled the spot of low melting solder is deposited on the first cap a spaced distance from the opening 13 and then some high melting solder is deposited directly over the opening 13 and the heat continued until both solder combinations flow together. This acts to seal the opening 13.

In FIGURE 5, a modified type of cap 4a is suggested such that the opening 13' can be placed at the point where a lead 14 can be inserted to seal the opening and the 2-step soldering operation is still utilized to attach and strengthen the connection of the lead to the cap.

The main requirement in each cap attaching step as indicated above is to provide sufficient solder so that a seal will be obtained at the bottom of the glass tube. As an example of the amount of solder required it was found in the case of a tubular element of .245" sealed by caps having an internal diameter of .250" that .08 gram of solder was satisfactory for obtaining the desired results by the above described technique of soldering to provide hermetically sealed products.

The joinder of the second cap to close the tubular element as above described was found satisfactory even with solders melting at temperatures higher than 300° C. The use of these high melting solders has been extremely difficult heretofore because of the tendency to dissolve or cause the metallic paints to peel off the tubular elements at these temperatures, especially when coupled with the wiping action of a soldering iron type of heat application.

It will be understood that the invention is not to be limited to the specific construction or arrangement of parts shown but that they may be widely modified within the invention defined by the claims.

What is claimed is:

1. A method of soldering metallic type end seals to a tubular element having metallic portions about each end thereof to provide a hermetically sealed unit consisting in the steps of placing a first cup-shaped end seal having flux-free solder bonded to and covering the bottom thereof against one end of the tubular element, heating the end seal to render the solder molten, moving the tubular element into the molten solder to form a liquid seal between the end of the tubular element and the first end seal, applying flux to the metallic portion of the tubular element to cause it to be wetted by solder from said first end seal to connect the tubular element to the end seal, permitting the molten solder to harden and thereafter piercing a small opening through said first end seal, placing a second cup-shaped end seal having fluxfree solder bonded to and covering the bottom thereof against the opposite end of the tubular element, heating the second end seal to render the solder molten, moving the tubular element into the molten solder in the second end seal to form a second liquid seal between the opposite end of the tubular element and the second end seal, applying flux to the metallic portion of the tubular element to cause it to be wetted by the molten solder to connect the opposite end of the tubular element to the second end seal, and sealing said small opening pierced in the first end seal before substantial cooling of the tubular element has occurred.

2. A method of soldering metallic type end seals to a tubular element having metallic portions about each end thereof to provide a hermetically sealed unit consisting in the steps of placing a first cup-shaped end seal having fluxfree solder bonded to and covering the bottom thereof against one end of the tubular element, heating the end seal to render the solder molten, moving the tubular element into the molten solder to form a liquid seal between the end of the tubular element and the first end seal, applying flux to the metallic portion about the end of the tubular element to solder the tubular element and end seal together without introducing flux into the interior of said tubular element, permitting the molten solder to harden, piercing a small hole in the connected end seal, placing a second cup-shaped end seal having flux-free solder bonded to and covering the bottom thereof against the opposite end of the tubular element, heating the end seal above the melting temperature of the solder, moving the end of the tubular element into the molten solder to form a second liquid seal and simultaneously allowing air to escape through said opening, applying flux to the metallic portion about the end of the tubular element to solder the tubular element and end seal together without introducing flux into the interior of said tubular element, and soldering said small opening closed by the steps of admixing a low temperature and a high temperature solder by adequate and prolonged heat.

3. A method of soldering metallic type end seals to a tubular element as claimed in claim 2 wherein the admixing of the solder consists of depositing a low temperature solder a spaced distance from said small opening in the first end seal, depositing a high temperature solder on said small opening and maintaining the heat to allow said low temperature solder to flow and admix with said high temperature solder to seal said opening.

References Cited in the file of this patent

UNITED STATES PATENTS

| | | |
|---|---|---|
| 2,014,612 | Borton | Sept. 17, 1935 |
| 2,015,482 | Lilienfeld | Sept. 24, 1935 |
| 2,159,806 | Lenz et al. | May 23, 1939 |
| 2,228,087 | Rose | Jan. 7, 1941 |
| 2,313,315 | Blais | Mar. 9, 1943 |
| 2,444,312 | Roberds et al. | June 29, 1948 |
| 2,449,759 | Barschdorf | Sept. 21, 1948 |
| 2,454,244 | Wintermute | Nov. 16, 1948 |
| 2,503,429 | Ziegler | Apr. 11, 1950 |
| 2,508,488 | Bouton et al. | May 23, 1950 |
| 2,538,495 | Barry | Jan. 16, 1951 |
| 2,576,405 | McAlister | Nov. 27, 1951 |
| 2,659,790 | Jurgensen | Nov. 17, 1953 |
| 2,673,972 | Minnium | Mar. 30, 1954 |
| 2,685,893 | Phipps | Aug. 10, 1954 |
| 2,699,594 | Bowne | Jan. 18, 1955 |
| 2,773,570 | Mihran et al. | Dec. 11, 1955 |
| 2,775,028 | Wampler | Dec. 25, 1956 |
| 2,824,364 | Bovenkerk | Feb. 25, 1958 |
| 2,836,702 | Stelmak et al. | May 27, 1958 |